United States Patent
Perera et al.

(10) Patent No.: US 9,815,964 B2
(45) Date of Patent: Nov. 14, 2017

(54) POLYESTER COMPOSITION FOR EXTRUSION BLOW MOLDED CONTAINERS WITH IMPROVED AGING AND DROP PERFORMANCE

(71) Applicant: Auriga Polymers, Inc., Charlotte, NC (US)

(72) Inventors: K. Prasanna U. Perera, Spartanburg, SC (US); Geoffrey R. Scantlebury, Charlotte, NC (US)

(73) Assignee: Auriga Polymers, Inc., Charlotte, NC (US)

( * ) Notice: Subject to any disclaimer, the term of this patent is extended or adjusted under 35 U.S.C. 154(b) by 0 days.

(21) Appl. No.: 15/030,719

(22) PCT Filed: Oct. 28, 2014

(86) PCT No.: PCT/US2014/062604
§ 371 (c)(1),
(2) Date: Apr. 20, 2016

(87) PCT Pub. No.: WO2015/065994
PCT Pub. Date: May 7, 2015

(65) Prior Publication Data
US 2016/0237240 A1    Aug. 18, 2016

Related U.S. Application Data

(60) Provisional application No. 61/897,606, filed on Oct. 30, 2013.

(51) Int. Cl.
| | |
|---|---|
| C08K 3/36 | (2006.01) |
| B29C 49/04 | (2006.01) |
| C08G 63/199 | (2006.01) |
| B29C 47/00 | (2006.01) |
| B29C 47/88 | (2006.01) |
| B29C 47/92 | (2006.01) |
| B29C 49/00 | (2006.01) |
| B65D 23/10 | (2006.01) |
| B29K 67/00 | (2006.01) |
| B29K 509/00 | (2006.01) |
| B29L 31/00 | (2006.01) |

(52) U.S. Cl.
CPC ............ *C08K 3/36* (2013.01); *B29C 47/0021* (2013.01); *B29C 47/0054* (2013.01); *B29C 47/8845* (2013.01); *B29C 47/92* (2013.01); *B29C 49/0005* (2013.01); *B29C 49/04* (2013.01); *B65D 23/10* (2013.01); *C08G 63/199* (2013.01); *B29C 2947/92704* (2013.01); *B29K 2067/00* (2013.01); *B29K 2509/00* (2013.01); *B29L 2031/712* (2013.01)

(58) Field of Classification Search
CPC ........................................................ C08K 3/36
USPC .......................................................... 524/493
See application file for complete search history.

(56) References Cited

U.S. PATENT DOCUMENTS

| | | | |
|---|---|---|---|
| 4,246,378 A | 1/1981 | Kometani et al. | |
| 4,544,677 A | 10/1985 | Allen et al. | |
| 5,661,193 A * | 8/1997 | Khemani ............... | C08G 63/20 521/138 |
| 6,150,454 A | 11/2000 | Wu et al. | |
| 6,200,659 B1 | 3/2001 | Fujimori et al. | |
| 7,097,060 B2 | 8/2006 | Penny et al. | |
| 2008/0246191 A1 | 10/2008 | Agarwal et al. | |

OTHER PUBLICATIONS

Eastman Tritan Copolyester: Redefining the Balance Between Toughness and Heat Resistance, Eastman, © Eastman Chemical Company 2010, MBS-612A 02/10 http://www.eastman.com/Literature_Center/M/MBS612.pdf.
Matthews, "Surface Properties of Polyethylene terephthalate)", May 2007, pp. i-xiv, 1-9, 12,13,21,26,31,36,38,40,42-45. https://etd.ohiolink.edu/rws_etd/document/get/toledo1177515548/inline.
International Search Report for International Application No. PCT/US2014/062604 dated Feb. 18, 2015.
Eastman Chemical Company, Product Regulatory Information Sheet, Print Date Jun. 12, 2013, Version May 13, 2013 (00001.0009) 71070312, pp. 1-6; www..eastman.com.

* cited by examiner

*Primary Examiner* — Terressa Boykin
(74) *Attorney, Agent, or Firm* — Gregory N. Clements; Clements Bernard Walker, PLLC

(57) ABSTRACT

The present invention relates to a polyester resin for extrusion blow molded containers comprising a branched copolymer and fumed silica to improve the aged drop performance said branched copolyester is made from the reaction of purified terephthalic acid or its dimethyl ester, ethylene glycol, bifunctional diacid other than terephthalic acid, diol other than ethylene glycol, and multifunctional compound having a least 3 carboxyl groups, hydroxyl groups and/or ester forming groups thereof, said fumed silica has a particle size of 0.1 to 5 microns and is present at about 100 ppm to about 2,500 ppm based on the weight of said copolyester.

18 Claims, No Drawings

1

POLYESTER COMPOSITION FOR EXTRUSION BLOW MOLDED CONTAINERS WITH IMPROVED AGING AND DROP PERFORMANCE

PRIORITY

This application claims the benefit of U.S. Provisional Application 61/897,606 filed Oct. 30, 2013.

FIELD OF THE INVENTION

This invention relates to polyester polymers, and more particular to polyethylene terephthalate copolyesters containing fillers for use in making transparent extrusion blow molded containers. Such containers are useful for a variety of products such as soft drink bottles, milk jugs and shampoo bottles.

BACKGROUND OF THE INVENTION

Aromatic polyesters generally are semi-crystalline and have low melt strength. Containers made from polyethylene terephthalate (PET), with minor amounts of a comonomer, by the injection stretch molding process (ISBM) are the most common transparent container on the market. However the ISBM process is limited to uniform shapes and cannot produce bottles with a handle. Handles are desirable for larger bottles and containers for easy of handling by the consumer. Such larger bottles and containers with handles can be produced by the extrusion blow molding (EBM) process.

A typical extrusion blow molding manufacturing process involves: a) melting the resin in an extruder; b) extruding the molten resin through a die to form a tube of molten polymer (a parison); c) clamping a mold having the desired finished shape around the parison; d) blowing air into the parison, causing the extrudate to stretch and expand to fill the mold; e) cooling the molded container; f) ejecting the container from the mold; and g) removing excess plastic (flash) from the container (if any).

The hot parison that is extruded in this process often must hang for several seconds under its own weight prior to the mold being clamped around it. During this time, the extrudate must have high melt strength. A material with high melt strength can resist stretching, flowing, and sagging, that would cause uneven material distribution in the parison and thinning of the parison walls. The sag of the extruded parison is directly related to the weight of the parison, whereby larger and heavier parisons will have a greater tendency to sag. Melt strength is directly related to the viscosity of the polyester resin at the temperature of extrusion from the die, at zero shear rate. However a resin with high melt strength, or high melt viscosity at zero shear rate, is too viscous to be extruded in the extruder and pumped through the die without using high temperatures which cause the polymer to degrade and lose its melt viscosity. The polyester resin must have a rheology such that the viscosity at the shear rates associated with the extrusion process, generally 100 to 1000 $s^{-1}$, is lower than the viscosity at zero shear rate, i.e. exhibits shear thinning.

The typical PET resins used to ISBM beverage containers are not suitable for extrusion blow molding due to their relatively low intrinsic viscosities (IV≤0.85 dL/g) and high melting points (>245° C.) which gives a low melt strength at the temperatures needed to process them.

In addition during the extrusion blow molding process the molten polyester cannot thermally crystallize otherwise a cloudy container is produced. Unlike the ISBM process, the EBM process produces waste from the flash that has to be cut off the molded container where, for instance, it has been clamped. This waste from the EBM process must be reground and mixed with the virgin resin and dried prior to re-extrusion.

Prior art has met these requirements for extrusion blow molding by using comonomers such as isophthalic acid, 1,4-cyclohexanedimethanol in order to reduce the thermal crystallization rate (*Modern Polyesters: Chemistry and Technology of Polyesters and Copolyesters* 2003, 246-247). Amorphous copolyesters using 1,4-cyclohexanedimethanol as a comonomer for EBM have been disclosed, for example in U.S. Pat. Nos. 4,983,711; 6,740,377; 7,025,925; 7,026,027; 2006/0094858; 2009/0181196; 2009/01812017,834,127; 7,915,374 and 2001/0081510. Higher melt strengths at a zero shear rate with shear thinning that reduces the melt viscosity at higher shear rates have been achieved by the use of branching agents such as trimellitic anhydride and pentaerythritol as disclosed in U.S. Pat. Nos. 4,132,707 and 4,999,388. All these copolyesters designed for EBM are essentially amorphous copolyesters. Alternatively high melt strength copolyester with an ultra-high molecular weight (IV>1.1 dL/g) can be used to provide the necessary melt strength as they exhibit some degree of shear thinning (US 2011/0256331). These ultra-high IV polyester resins have to be processed at higher temperatures which cause the resin to thermally degrade giving increased yellowness in the container, and a narrow EBM processing window.

Containers made from amorphous copolyesters, when added to the postconsumer PET recycling stream, tend to cause sticking, agglomeration and bridging issues during the drying process. This makes such EBM PET resins unsuitable for reuse in the post-consumer polyester recycle stream that is used in blends with virgin resins for use in the standard container and bottle ISBM process. PolyClear® EBM resin (Auriga Polymers Inc., Spartanburg, S.C. USA) is one commercial resin (partially crystalline) that has been approved by the Association of Postconsumer Plastic Recyclers (APR) for recycling in the postconsumer recycling stream.

A key requirement for an extrusion blow molded container is its ability to be dropped with a liquid therein without breaking. It is well known that amorphous polyesters age with time (A. Bhakkad, E. A. Lofgren and S. A. Jabarin, *ANTEC* 2000 *Conference Proceedings*, pages 2019-2023) making containers made from amorphous polyesters more brittle with age (lower impact resistance), and thus more prone to breakage when dropped.

Fillers have been added to polyester film and bottle resins in order to reduce the coefficient of friction of the film and/or bottle surface, antistick or antiblock agents. Antislip agents based on silicas have been disclosed in U.S. Pat. Nos. 5,278,205; 5,278,221; 5,384,191; 5,266,397; 5,281,379; 5,475,046; 5,382,651 and 6,323,271. Antiblock agents based on talc, tethered talc with fatty acids, barium sulfate, zinc sulfate and calcium phosphates are disclosed in U.S. Pat. No. 6,903,154 directed at reducing the coefficient of friction of ISBM polyester bottles, while maintaining clarity. US2011/0150751 discloses typical antiblock agents for polyester films: calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polystyrene particles or crosslinked acrylate particles. The antiblocking agents selected may also be mixtures of two or more different antiblocking agents or mixtures of antiblocking agents of the same composition but different particle size.

None of these patents discloses the use of these fillers to improve the aging of polyester articles.

There is therefore a need for a polyester resin that meets all the requirements of the extrusion blow molding process to form a container that maintains its impact resistance over time.

SUMMARY OF INVENTION

In the broadest sense, the present invention relates to a polyester resin for extrusion blow molded bottles comprising a branched copolymer and fumed silica to improve the aged drop performance.

In the broadest sense, the polyester resin for improving the aged drop performance of bottles has purified terephthalic acid, ethylene glycol, pentaerythritol and fumed silica.

The fumed silica has a particle size of 0.1 to 5 microns. The pentaerythritol is a multifunctional branching agent.

DESCRIPTION OF THE INVENTION

The ranges set forth herein include both numbers at the end of each range and any conceivable number there between, as that is the very definition of a range.

It has been found that the addition of fillers with a particle size in the range of about 0.1 micron to 5 micron to commercial EBM polyester resins reduces the aging process and gives bottles and containers made from such compositions that maintain their impact resistance for at least a month. On the other hand, EBM resins without the addition of such fillers possess a reduction of about 20%, in aged drop "pass rate".

Polyester EBM resins are generally prepared by the addition of comonomers to retard the crystallization rate of the polyester resin together with a multifunctional branching agent to increase the melt strength and provide the resin with a shear thinning rheological behavior.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone, resorcinol or other heterocyclic diols, and isosorbide, for example.

The term "moiety", as used herein, means any organic structure incorporated into a polymer through a polycondensation and/or an esterification reaction from the corresponding monomer. The term "repeating unit", as used herein, means an organic structure having a dicarboxylic acid moiety and a diol moiety bonded through a carbonyloxy group. Thus, for example, the dicarboxylic acid moieties may be derived from a dicarboxylic acid monomer or its associated acid halides, esters, salts, anhydrides, and/or mixtures thereof. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and moieties thereof as well as any derivative of terephthalic acid, including its associated acid halides, esters, half-esters, salts, half-salts, anhydrides, mixed anhydrides, and/or mixtures thereof or moieties thereof useful in a reaction process with a diol to make polyester.

The polyesters used in the present invention typically can be prepared from dicarboxylic acids and diols which react in substantially equal proportions and are incorporated into the polyester polymer as their corresponding moieties. The polyesters of the present invention, therefore, can contain substantially equal molar proportions of acid moieties (100 mole %) and diol (and/or multifunctional hydroxyl compound) moieties (100 mole %) such that the total moles of repeating units is equal to 100 mole %. The mole percentages provided in the present disclosure, therefore, may be based on the total moles of acid moieties, the total moles of diol moieties, or the total moles of repeating units. For example, a polyester containing 10 mole % isophthalic acid, based on the total acid moieties, means the polyester contains 10 mole % isophthalic acid moieties out of a total of 100 mole % acid moieties. Thus, there are 10 mole of isophthalic acid moieties among every 100 mole of acid moieties. In another example, polyester containing 1.5 mole % diethylene glycol out of a total of 100 mole % diol moieties, has 1.5 mole of diethylene glycol moieties among every 100 mole of glycol moieties.

In other polyesters of the invention, the diol component employed in making the polyesters useful in the invention can comprise, consist essentially of, or consist of ethylene glycol and one or more difunctional glycols chosen from diethylene glycol, 1,2-propanediol, 1,5-pentanediol, 1,6-hexanediol, neopentyl glycol, p-xylene glycol, 1,4-cyclohexanedimethanol, 2,2,4,4-tetramethyl-1,3-cyclobutanediol, 1,3-propanediol, 1,4-butanediol, 2,4-diethyl-1,5-pentanediol, 2,2-dimethyl-1,3-propanediol, 2-ethyl-3-butyl-1,3-propanediol, pentacyclo-dipentadecane-dimethanol, 2-octyldecyl-1,3-propanediol, and mixtures thereof. The preferred glycol is ethylene glycol.

In addition to terephthalic acid and/or dimethyl terephthalate, the dicarboxylic acid component of the polyesters useful in the invention can comprise up to 30 mole %, up to 20 mole %, up to 10 mole %, up to 5 mole %, or up to 1 mole % of one or more modifying aromatic dicarboxylic acids. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. Heterocyclic dicarboxylic acid, for example 2,5-furan dicarboxylic acid may also be used. The preferred modifying aromatic dicarboxylic acids are isophthalic acid and 2,6-naphthalene dicarboxylic acid.

The dicarboxylic acid component of the polyesters useful in the invention can be further modified with up to 10 mole %, up to 5 mole % or up to 1 mole % of one or more aliphatic dicarboxylic acids containing 2 to 16 carbon atoms, such as, for example malonic, succinic, glutaric, adipic, pimelic, suberic, azelaic, cyclohexene-dicarboxylic acids, dodecane-dioic-dicarboxylic acids, diethyl-di-n-propyl malonate, dimethyl benzylmalonate, 2,2-dimethyl-malonic acid and 2,3-dimethyl glutaric acid. The preferred aliphatic dicarboxylic acid is adipic acid.

In the preferred polyesters useful in the invention is optionally a branching monomer, also referred to herein as a branching agent. When the polyester contains a branching agent, the branching agent can be present in an amount in the range of 0.01 to 1 mole %, or 0.1 to 0.6 mole %, based on the total mole percentages of either the diol or diacid moieties. The branching monomer present in the polyester has three or more carboxyl substituents, hydroxyl substituents, or a combination thereof. Examples of branching monomers include, but are not limited to, multifunctional acids or multifunctional alcohols such as trimellitic acid, trimellitic anhydride, pyromellitic dianhydride, trimethylolpropane, glycerol, sorbitol, 1,2,6-hexanetriol, pentaerythritol, citric acid, tartaric acid, 3-hydroxyglutaric acid, trimesic acid and the like. Ethoxylated or oxypropylated triols can also be used. In the preferred embodiment, the branching monomer moieties are chosen from at least one of the following: pentaerythritol, trimethylolpropane, trimethylolethane, trimellitic acid, and/or trimellitic anhydride.

The polyesters of the invention can also comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 to about 10% by weight, or about 0.1 to about 5% by weight, based on the total weight of the polyester.

Examples of fillers that may be used in the composition of this invention include amorphous silica particles with mean particle size diameters in the range of 500-1000 nm, and calcium carbonate particles with a medium particle size of 300-1200 nm. Precipitated alumina particles of sub-micron sizes may be used with an average particle size, for example, having a medium particle size of about 100 nm. Additional examples include inorganic particles, aluminum oxide, magnesium oxide, and titanium oxide, such complex oxides as kaolin, talc, and montmorillonite, such carbonates as calcium carbonate, magnesium and barium carbonate, such sulfates as calcium sulfate, and barium sulfate, such titanates as barium titanate and potassium titanate, and such phosphates as calcium phosphate and magnesium phosphate. Two or more of these may be used together to achieve a specific objective. Organic fillers such as crosslinked polystyrene or crosslinked acrylate particles may be used. The size and amount of these fillers are chosen to give a transparent bottle.

The preferred fillers used in the composition of the present invention can be chosen from the group consisting of fumed silica, colloidal silica, nano-silica, functionalized fumed or nano-silica and silica beads. (The term "beads" means any shape having smooth, curved edges, including spherical, oblate and other shapes.) Preferred are fumed silica and colloidal silica because these materials give rise to less haze in a finished EBM container than do the silica beads. Most preferred are fumed silicas. All such materials are commercially available and, for uses in food containers such as beverage containers, are approved for food packaging use. The silica beads used herein were purchased under the tradename KEP-150. Also useful in practicing the invention is a synthetic silicone product from GE Silicones which is sold under the tradename Tospearl. Fumed silicas are available from Cabot Corporation, Cab-O-Sil Division, Tuscola, Ill., under the tradename Cab-O-Sil. Colloidal and precipitated silicas are available from Nalco Chemical Company, Naperville, Ill.

Fumed silicas are white, free-flowing powders and are generally hydrophilic due to the presence of hydrophilic groups on the silica surface. The particles have a wide range of size which is dependent on the manufacturing process and the degree of agglomeration and mechanical entanglement which occurs during the manufacturing process and after cooling below the fusion point of silica. As a result, particles may range in size from about 100 nm (nanometer) to greater than 1000 nm. It was observed that as a result of such aggregation or agglomeration, fumed silica samples as obtained contained particles as large as 30,000 nm, which may be reduced in size upon solutioning or application of mixing. The range of fumed silica particle sizes which can be used in practicing the invention is large, ranging from about 100 nm to about 30,000 nm The Cab-O-Sil® M-5P silica used in the examples herein is reported by the manufacturer as being a three-dimensional branched-chain aggregate with a length of about 150 nm to about 200 nm and a mean aggregate diameter when dispersed in water of about 175 nm. A scanning electron micrograph of M-5P contained in the manufacturer's literature indicates that mechanical entanglement can increase particle size to over 1000 nm. Accordingly, based on experience herein with fumed silica, colloidal silica and silica beads, silica material of about 100 nm to about 5000 nm (5 micron) preferably from about 100 nm to about 1500 nm, can be used in practicing the invention.

The amount of silica material added to EBM copolyester composition is from about 50 ppm (parts per million based on weight of polymer) to about 2500 ppm, preferably from about 200 ppm to about 1000 ppm and most preferably about 100 ppm to 750 ppm. If less than 50 ppm silica is used, there is little improvement in impact resistance with age, unless functionalized fumed silica is used. If more than 2500 ppm of silica is used the EBM container is unacceptably hazy.

The silica material may be added to the polyester at any stage of the manufacturing process. Alternatively, a polyester resin can be manufactured and extruded to allow addition of the silica material, with mixing, prior to the use of the resin in the EBM process. From a manufacturing and economic viewpoint, the silica material is advantageously added to and mixed with the polyester during the polycondensation step.

In addition, the polyester compositions and the polymer blend compositions useful in the invention may also contain any amount of at least one additive, for example, from 0.01 to 2.5% by weight of the overall composition common additives such as colorants, toner(s), dyes, mold release agents, flame retardants, plasticizers, stabilizers, including but not limited to, UV stabilizers, thermal stabilizers and/or reaction products thereof, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. For transparent EBM containers the refractive index of these additives must closely match the refractive index of the polyester composition to prevent a hazy container. Moieties of such additives are also contemplated as part of the polyester composition.

In addition, certain agents which tone the polymer can be added to the melt. A bluing toner can be used to reduce the yellowness of the resulting polyester polymer melt phase product. Such bluing agents include blue inorganic and organic toner(s). In addition, red toner(s) can also be used to adjust the redness. Organic toner(s), e.g., blue and red organic toner(s) can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added depends, of course, on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from about 0.5 ppm to about 10 ppm.

In the preferred embodiment, the polyesters useful in this invention can be extrusion blow molded to give a visually transparent container. The term "visually transparent" is defined herein as an appreciable absence of cloudiness or haziness when inspected visually, or when the % haze/mm of the container wall is less than about 5%/mm, as measured by an Spectrophotometer instrument according to standard methods.

Conventional production of polyesters can be batch, semi-continuous or a continuous process. The polymerization process comprises the steps of: first reacting the dicarboxylic acids or their esters (generally dimethyl) with the diols at a temperature of about 200° C. to about 250° C. to form monomers and water (or methanol). Because the reaction is reversible, the water (or methanol) is continuously removed to drive the reaction to the production of monomer. The branching agent is normally added at this stage of the process. In the ester interchange process using the ester of the dicarboxylic acid certain well known catalysts such, such as manganese acetate, zinc acetate or cobalt acetate are used. After the ester interchange reaction these catalysts are sequestered with a phosphorus compound, such as phosphoric acid, to prevent degradation during the polycondensation process.

Next, the monomer undergoes a polycondensation reaction to form the polymer. In this process the temperature is increase to about 285° C. and a vacuum (about 150 Pa) applied to remove the diols. This polymerization is stopped when the required molecular weight is achieved, or the maximum molecular weight of the design of the equipment is reached. The polyester is extruded through a die into strands which are quenched and cut into pellets. The catalysts used for this reaction are general antimony, germanium, aluminum or titanium compounds or other catalyst known to those skilled in the art. The specific additives used and the point of introduction during the reaction is known in the art and does not form a part of the present invention. Any conventional system may be employed and those skilled in the art can pick and choose among the various systems for the introduction of additives to select the best for the desired result. The polyester pellets can be further polymerized to a higher molecular weight by known solid state polymerization processes.

In another aspect, this invention relates to a process for preparing extrusion blow molded containers. The extrusion blow molding process can be any extrusion blow molding manufacturing process known in the art. Although not limited thereto, a typical description of extrusion blow molding manufacturing process involves: 1) melting the resin in an extruder; 2) extruding the molten resin through a die to form a tube of molten polymer (i.e. a parison); 3) clamping a mold having the desired finished shape around the parison; 4) blowing air into the parison, causing the extrudate to stretch and expand to fill the mold; 5) cooling the molded container; 6) ejecting the container from the mold; and 7) removing excess plastic (commonly referred to as flash) from the container, if desired.

The term "container" as used herein is understood to mean a receptacle in which material is held or stored. Containers include but are not limited to bottles, bags, vials, tubes and jars. Applications in the industry for these types of containers include but are not limited to food, beverage, cosmetics, household or chemical containers and personal care applications. The term "bottle" as used herein is understood to mean a receptacle containing plastic which is capable of storing or holding liquid.

The exact resin formulation must provide a melt such that when extruded has a high melt strength can resist stretching and flowing, sagging, that would cause uneven material distribution in the parison and thinning of the parison walls. Melt strength is directly related to the viscosity of the polyester resin at the temperature of extrusion from the die, at zero shear rate. However a resin with high melt strength, or high melt viscosity at zero shear rate, is too viscous to be extruded in the extruder and pumped through the die without using high temperatures with cause the polymer to degrade and lose its melt viscosity. The polyester resin must have a rheology such that the viscosity at the shear rates associated with the extrusion process, generally 100 to 1000 $s^{-1}$, is lower than the viscosity at zero shear rate, i.e. exhibits shear thinning. The melt strength can be measured using a Melt Indexer which extrudes the resin at a zero shear rate at the die. The length of the extrudate after a period of time (L1) can be compared with the length after the same period of time (L2). The ratio of L2/L1, melt strength, gives a measure of the sag of the extrudate, this ratio being 1.0 if there is no sag. This ratio increases as the melt strength becomes weaker and L2 increases as the extrudate cannot support its own weight. For EBM resin the melt strength should be the range of about 1 to about 1.1 when measured at the extrusion temperature that will be used in the manufacture of a container.

In addition during the extrusion blow molding process the molten polyester cannot thermally crystallize otherwise a cloudy container is produced. The EBM process produces waste from the flash that has to be cut off the molded container where, for instance, it has been clamped. This waste from the EBM process must be reground and mixed with the virgin resin and dried prior to re-extrusion. The resin therefore has to have a low level of crystallinity such that it does not agglomerate during drying.

In order to pass the APR Critical Guidance protocol for use in the postconsumer clear polyester recycle stream, the polyester resins of this invention must be semi-crystalline, i.e. exhibit a melting endotherm as detected by Differential Scanning calorimetry.

Another parameter that must be met with the resin relates to the drop resistance of an EBM container filled with liquid when dropped from a height, as measured by the Bruceton Staircase Method. Resin compositions can be evaluated for their impact resistance by measuring the impact energy of a film when struck by the hemispherical end of a plunger travelling at about 162 mm/min.

There are various methods by which the affect of aging of amorphous polyesters on various properties can be quantified. As amorphous polyester age, the polymer chains relax leading to a decrease in the free volume of the material. During a Differential Scanning calorimeter (DSC) scan, a relaxation endotherm can be detected near the glass transition temperature. The enthalpy of relaxation increases with the aging time. During aging the impact failure of injection molded bars and films changes from a ductile to a brittle failure. This is best measured by determining the high speed puncture properties of a film over a range of test velocities. For EBM containers, the drop resistance can be measured over a period of time. Prior art EBM containers exhibit a decrease in drop resistance within one week of manufacture. EBM containers made from the compositions of this invention maintain their initial drop resistance for a period of at least a month.

Test and Preparative Methods

1. Test Methods
a. The Intrinsic Viscosity of the polyesters are measured according to ASTM D 4603-96, and reported in units of dL/g.
b. The relaxation enthalpy of the polyesters was measured using a Perkin Elmer DSC instrument calibrated with tin and indium standards. A sample was weighed into the sample pan, about 10 mg, and the DSC instrument was set to heat the sample at a rate of 10° C./min from room temperature up to 100° C. The area of the relaxation endotherm at the glass transition temperature was measured and reported in units of J/g. The resins were stored at 23° C. and 50% Relative Humidity for aging.
c. The melting point was taken as the peak of the melting endotherm of the copolyester as measured in accordance with ASTM D 3418-03. The sample was heated to 305° C. at a rate of 20° C./min, held for 3 minutes and rapidly quenched to 20° C. The sample was heated at 20° C./min to 305° C. and the peak melting endotherm temperature recorded.
d. The total impact energy of the film samples was measured according to ASTM D 3763-06. The film was cut to a 5 by 10 cm rectangle and mounted between two rectangular sample fixtures at a 45° angle. The average velocity of the plunger was about 162 mm/min. The energy, in joules, to the point of deflection where the load first occurred was recorded.
e. The drop resistance of the containers was measured according to ASTM D 2463-95, procedure B, Bruceton Staircase Method. The containers were filed with 1.5 liter of water (23° C.) prior to dropping. The containers were stored at 23° C. and 50% Relative Humidity for aging.
f. The haze of the film was measured with a HunterLab ColorQuest spectrophotometer, substantially in accordance with ASTM D1003 and expressed as % haze/mm (thickness).
g. The melt strength of the polymer was measured using ASTM D 1238-04c, *Standard Test Method for Melt Flow Rates of Thermoplastics by Extrusion Plastometer*. The temperature used for this measurement was that which corresponded to a Melt Flow Index for the polymer of 2.3±0.1 g/10 min, using a load of 2.16 kg. The length of the extrudate ($L_1$) after 50 sec was measured, and the total length (L) after 100 sec was measured, and the extrudate immediately cut off the melt indexer and weighed to calculate the Melt Flow Index. The length extruded in the second 50 sec ($L_2$) was calculated from $L_1$ and L:

$$L_2 = L - L_1,$$

and the melt strength is defined as $L_2/L_1$–a dimensionless ratio.
h. The metal content of the ground polymer samples was measured with an Atom Scan 16 ICP Emission Spectrograph. The sample was dissolved by heating in ethanolamine, and on cooling, distilled water was added to crystallize out the terephthalic acid. The solution was centrifuged, and the supernatant liquid analyzed. Comparison of atomic emissions from the samples under analysis with those of solutions of known metal ion concentrations was used to determine the experimental values of metals retained in the polymer samples.
i. The DEG (diethylene glycol) and multifunctional hydroxyl branching agent content of the polymer were determined by hydrolyzing the polymer with an aqueous solution of ammonium hydroxide in a sealed reaction vessel at 220+5° C. for approximately two hours. The liquid portion of the hydrolyzed product was then analyzed by gas chromatography. The gas chromatography apparatus was a FID Detector (HP5890, HP7673A) from Hewlett Packard. The ammonium hydroxide was 28 to 30% by weight ammonium hydroxide from Fisher Scientific and was reagent grade.
j. The isophthalic acid and multifunctional acid or anhydride branching agent content of the polymer was determined at 285 nanometers using a Hewlett Packard Liquid Chromatograph (HPLC) with an ultraviolet detector. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.

2) Preparative Methods
a) Preparation of film
The copolyesters were melted in a Haake single screw extruder and cast onto a chilled roll to provide a nominal film thickness of 0.65 mm.
b) Extrusion blow molded bottles
A 90 mm Bekum H-121 continuous extrusion blow molding machine fitted with a barrier screw (Glycon Fusion) was used to produce the EBM containers. These containers were standard 1.75 liter, rectangular handleware containers weighing 95 g. The processing temperatures were adjusted between 245 and 260° C. to obtained an even polymer distribution in the containers. The copolyesters were dried to a moisture level of less than 50 ppm prior to extrusion.

c) Preparation of polyesters

A series of copolyesters were prepared from dimethyl terephthalate (DMT) containing 6.9 weight % isophthalic acid (IPA) and 0.05 weight % pentaerythritol, with various amounts of fumed silica, ppm based on polymer. This fumed silica had a mean aggregate diameter of 175 nm. Manganese acetate was used as the ester interchange catalyst, sequestered with polyphosphoric acid. Antimony trioxide was used as the polycondensation catalyst and stabilized with a prestabilized cobalt acetate/phosphoric acid ethylene glycol solution. These copolyesters formed 0.8 weight % diethylene glycol and contained the following elemental analysis: Mn, 82 ppm, Co, 68 ppm, P, 38 ppm and Sb, 250 ppm. The amorphous IV of these copolyesters was 0.66 dL/g.

Another series of polyesters were prepared from DMT as above, but containing an additional comonomer than IPA, i.e. neopentyl glycol (NPG) and 2,6-naphthalene dicarboxylic acid (NDC)

These amorphous copolyesters were solid phase polymerized to their final IV.

EXAMPLES

Example 1

The final IV, extrusion temperature, melt strength, the Melt Flow Index (MFI) and the haze of the bottles of the copolyesters prepared from DMT, containing 6.9 weight % IPA and 0.05 wt. % pentaerythritol were measured and the results set forth in Table I. Included in this table is the corresponding results for two commercial polyester EBM resins: Eastman Aspira™ copolyester EB062 (an amorphous copolyester), and Auriga polymers PolyClear® EBM 5505 resin (a semi-crystalline copolyester).

TABLE I

| Polymer | Fumed silica, ppm | IV, dL/g | Extrusion temperature, ° C. | Melt Strength | MFI, g/10 min | Haze, %/mm |
|---|---|---|---|---|---|---|
| C1 | 0 | 1.0 | 265 | 1.11 | 2.27 | 4.03 |
| P1 | 100 | 1.0 | 261 | 1.06 | 2.31 | 4.06 |
| P2 | 300 | 1.0 | 257 | 1.07 | 2.32 | 4.12 |
| P3 | 1000 | 1.1 | 285 | 1.10 | 2.21 | 4.55 |
| EB062 | — | 0.8 | 230 | 1.22 | 2.27 | 4.44 |
| EBM 5505 | — | 1.0 | 265 | 1.10 | 2.30 | 3.93 |

The relaxation enthalpy of the resins was measured after 1 day, 1 week, 2 weeks and 4 weeks and the results set forth in Table II.

TABLE II

| | Relaxation Enthalpy, J/g | | | |
|---|---|---|---|---|
| Polymer | 1 day | 1 week | 2 weeks | 4 weeks |
| C1 | 0.184 | 0.137 | 0.296 | 0.355 |
| P1 | 0.151 | 0.246 | 0.235 | 0.263 |
| P2 | 0.156 | 0.174 | 0.237 | 0.207 |

The presence of 300 ppm fumed silica retarded the increase in relaxation enthalpy after a month of aging.

The total impact energy of the films extruded from the copolyesters was measured 1 day and 2 weeks after preparation and the results set forth in Table III.

TABLE III

| | Total energy, Joules | |
|---|---|---|
| Polymer | 1 day | 2 weeks |
| C1 | 3.67 | 2.95 |
| P1 | 4.22 | 4.08 |
| P2 | 4.40 | 4.83 |
| P3 | 4.36 | 5.08 |

Increasing amounts of fumed silica not only improved the initial impact energy of the films, but showed that the total energy increased with aging.

The drop impact resistance of 21 EBM bottles was measured after 1 day, 1 week, 2 weeks and 4 weeks and the mean height (cm) are set forth in Table IV. The initial height was 91.4 cm and the height increments were 15.2 cm.

TABLE IV

| | Drop Impact Resistance (cm) | | |
|---|---|---|---|
| | C | P1 | P2 |
| 24 hours | 117.7 | 121.9 | 120.4 |
| 1 week | 70.1 | 112.6 | 129.5 |
| 2 weeks | 79.2 | 99.1 | 97.5 |
| 1 month | 79.2 | 107.5 | 109.2 |

The control average drop height decreased to 67% of its original drop height after one month's aging, compared to only 88% and 91% for examples P1 and P2 respectively.

Example 2

Two polyesters were prepared using a PTA continuous polymerization process containing 6.4 weight % IPA, one of which additionally contained 240 ppm fumed silica. Using a DMT batch reactor, following the procedure used in Example 1, copolyesters were prepared containing a mixture of IPA, NPG and NDC as comonomers. Blends of the PTA copolyesters and the DMT copolyesters were made to obtain copolyester comparison with the different comonomers with and without fumed silica.

EBM bottles were prepared as in Example 1, and the bottle drop impact resistance was measured. The composition of these copolyesters is set forth in Table V, all % and ppm is based on the weight of the final copolyester, together with the reduction in average drop height after 1 month.

TABLE V

| Polymer | IPA, % | NPG, % | NDC, % | Fumed silica, ppm | Bottle IV, dL/g | Reduction in drop height after 1 month |
|---------|--------|--------|--------|-------------------|-----------------|----------------------------------------|
| P5 | 5.12 | 0.48 | — | — | 0.95 | 71% |
| P6 | 5.12 | 0.48 | — | 190 | 0.92 | 86% |
| P7 | 5.12 | — | 1.14 | — | 0.93 | 93% |
| P8 | 5.12 | — | 1.14 | 190 | 0.94 | 96% |

The addition of fumed silica improved the bottle aging with these copolyesters.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A copolyester for an extrusion blow molded container comprising: a branched copolyester and fumed silica, wherein the amount of said fumed silica is about 50 ppm to about 2,500 ppm based on the weight of said branched copolyester and wherein said container has improved aged drop resistance compared to containers without fumed silica.

2. The copolyester of claim 1, wherein said fumed silica has a particle size of 0.1 to 5 microns.

3. The copolyester of claim 1, wherein said branched copolyester is made from the reaction of purified terephthalic acid or its dimethyl ester, ethylene glycol, bifunctional diacid other than terephthalic acid, diol other than ethylene glycol, and multifunctional compound having a least 3 carboxyl groups, hydroxyl groups and/or ester forming groups thereof.

4. The branched copolyester of claim 3, wherein the amount of said bifunctional acid and diol is about 1 to about 30 mole % of the total copolyester.

5. The branched copolyester of claim 3, wherein the amount of said multifunctional compound is about 0.01 to 1 mole % of the total copolyester.

6. The copolyester of claim 1 having a melt strength of about 1.0 to about 1.1.

7. The copolyester of claim 1 having a relaxation enthalpy after 2 weeks of less than about 0.25 J/g.

8. A film from the copolyester of claim 1 having impact energy after 2 weeks of at least 95% of its impact energy after 1 day.

9. A standard 1.75 liter, rectangular handleware extrusion blow molded container weighing about 100 g of the said copolyester of claim 1, having an average drop height impact resistance after 2 weeks greater than about 100 cm as measured by ASTM D2463-95, procedure B.

10. A process for manufacturing the copolyester of claim 1, comprising: a) esterifying or transesterifying raw materials comprising terephthalic acid or its dimethyl ester, ethylene glycol, bifunctional diacid or its dimethyl ester, other than terephthalic acid, diol other than ethylene glycol, and multifunctional compound having a least 3 carboxyl groups, hydroxyl groups and/or ester forming groups thereof and fumed silica; b) melt polymerizing the ester formed in step a) above to prepare an amorphous branched copolyester containing fumed silica; c) quenching, cutting strands of the molten copolyester formed in step b); d) solid phase polymerizing the copolyester formed in step c) to the required molecular weight.

11. The process of claim 10, wherein said fumed silica has a particle size of 0.1 to 5 microns.

12. The process of claim 11, wherein the amount of said fumed silica is about 100 ppm to about 2,500 ppm based on the weight of said copolyester.

13. The process of claim 10, wherein the amount of said bifunctional acid and diol is about 1 to about 30 mole % of the total copolyester.

14. The process of claim 10, wherein the amount of said multifunctional compound is about 0.01 to 1 mole % of the total copolyester.

15. The process of claim 10, wherein said copolyester has a melt strength of about 1.0 to about 1.1.

16. The process of claim 10, wherein said copolyester has a relaxation enthalpy after 2 weeks of less than about 0.25 J/g.

17. An extrusion blow molded copolyester for an extrusion blow molded container comprising: a branched copolyester and fumed silica, wherein the amount of said fumed silica is about 50 ppm to about 2,500 ppm based on the weight of said branched copolyester and wherein said container has improved aged drop resistance compared to containers without fumed silica.

18. An extrusion blow molded container comprising a branched copolyester and fumed silica, wherein the amount of fumed silica is about 50 ppm to 1000 ppm based on the weight of the branched copolyester.

\* \* \* \* \*